Figure 1:
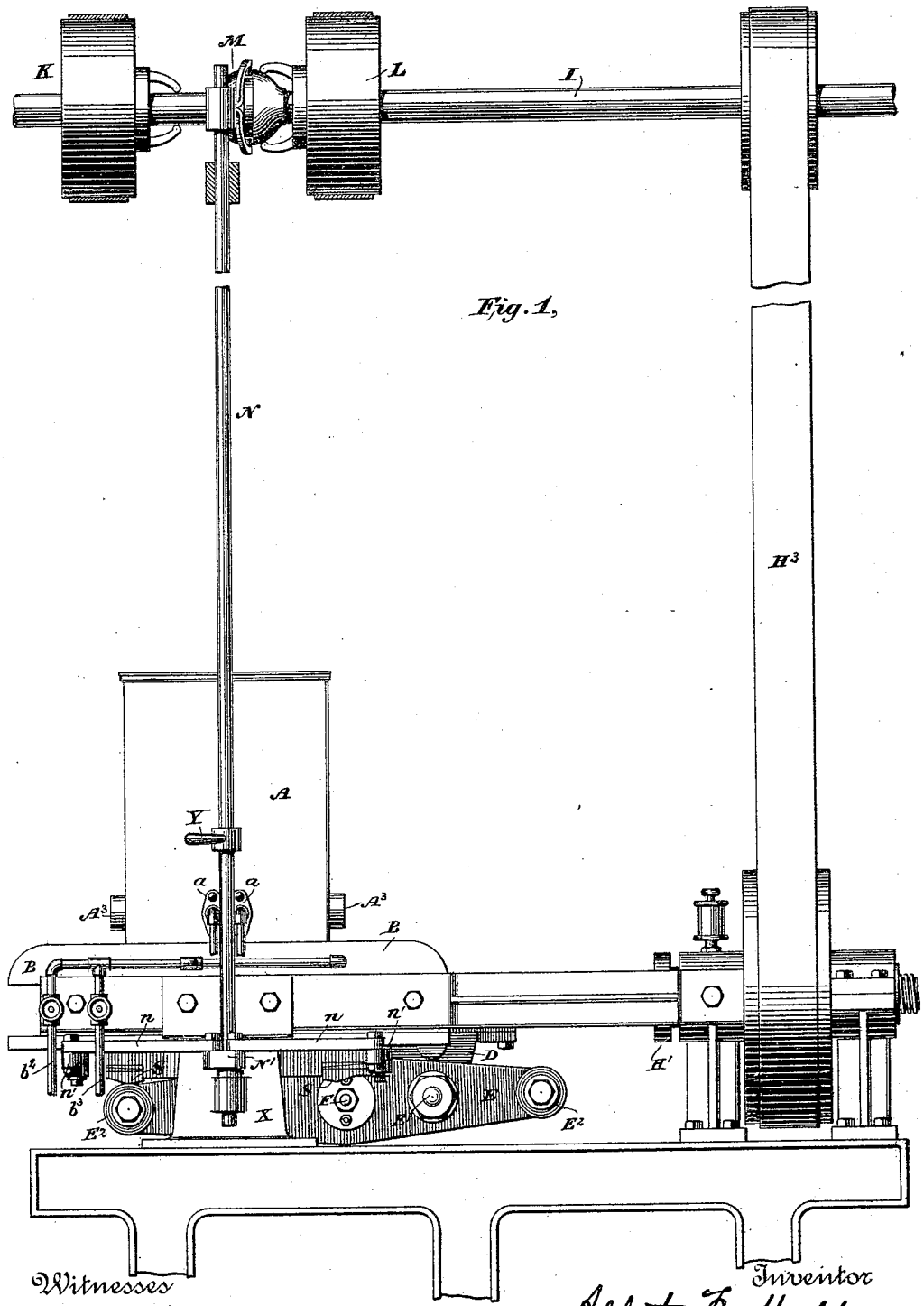

(No Model.) 5 Sheets—Sheet 1.
A. F. MADDEN.
MACHINE FOR CASTING GRIDS FOR SECONDARY BATTERIES.
No. 457,879. Patented Aug. 18, 1891.

Witnesses
Geo. W. Breck.
Henry W. Lloyd.

Inventor
Albert F. Madden,
By his Attorneys
Baldwin, Davidson & Wight.

(No Model.) 5 Sheets—Sheet 2.
A. F. MADDEN.
MACHINE FOR CASTING GRIDS FOR SECONDARY BATTERIES.
No. 457,879. Patented Aug. 18, 1891.
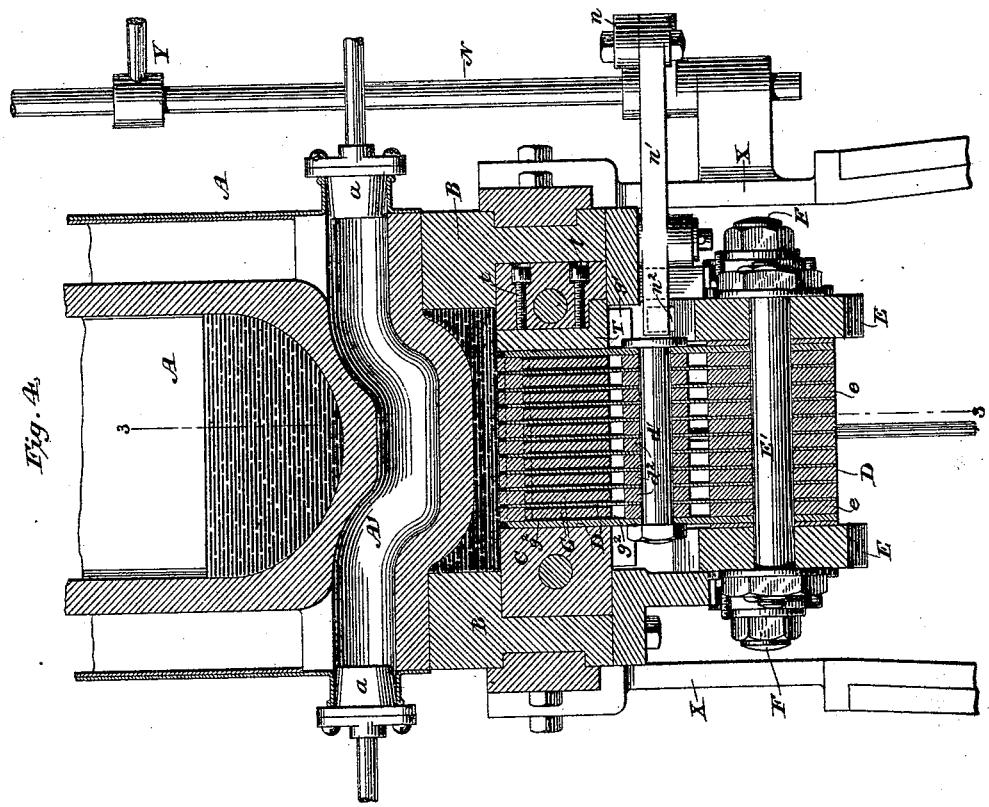
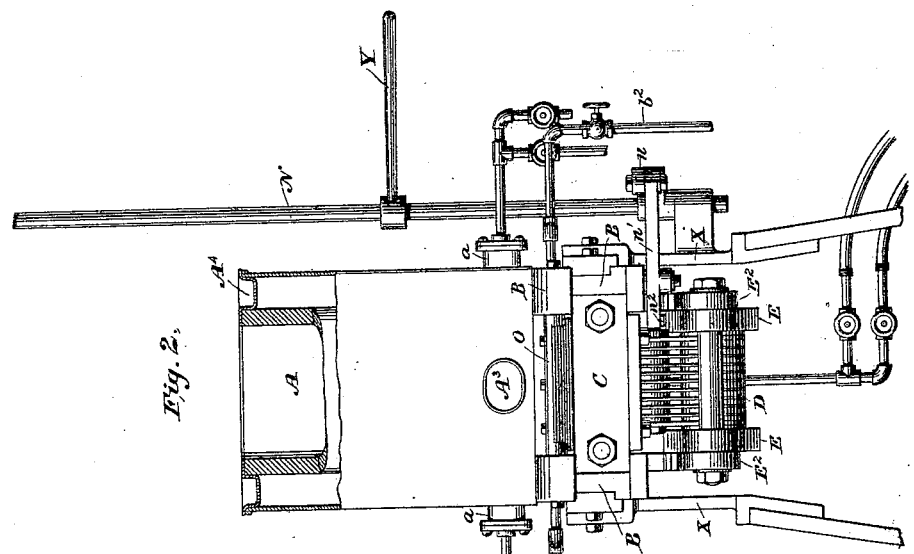
Witnesses
Geo. W. Breck
Henry W. Lloyd
Inventor
Albert F. Madden,
By his Attorneys
Baldwin, Davidson & Wight

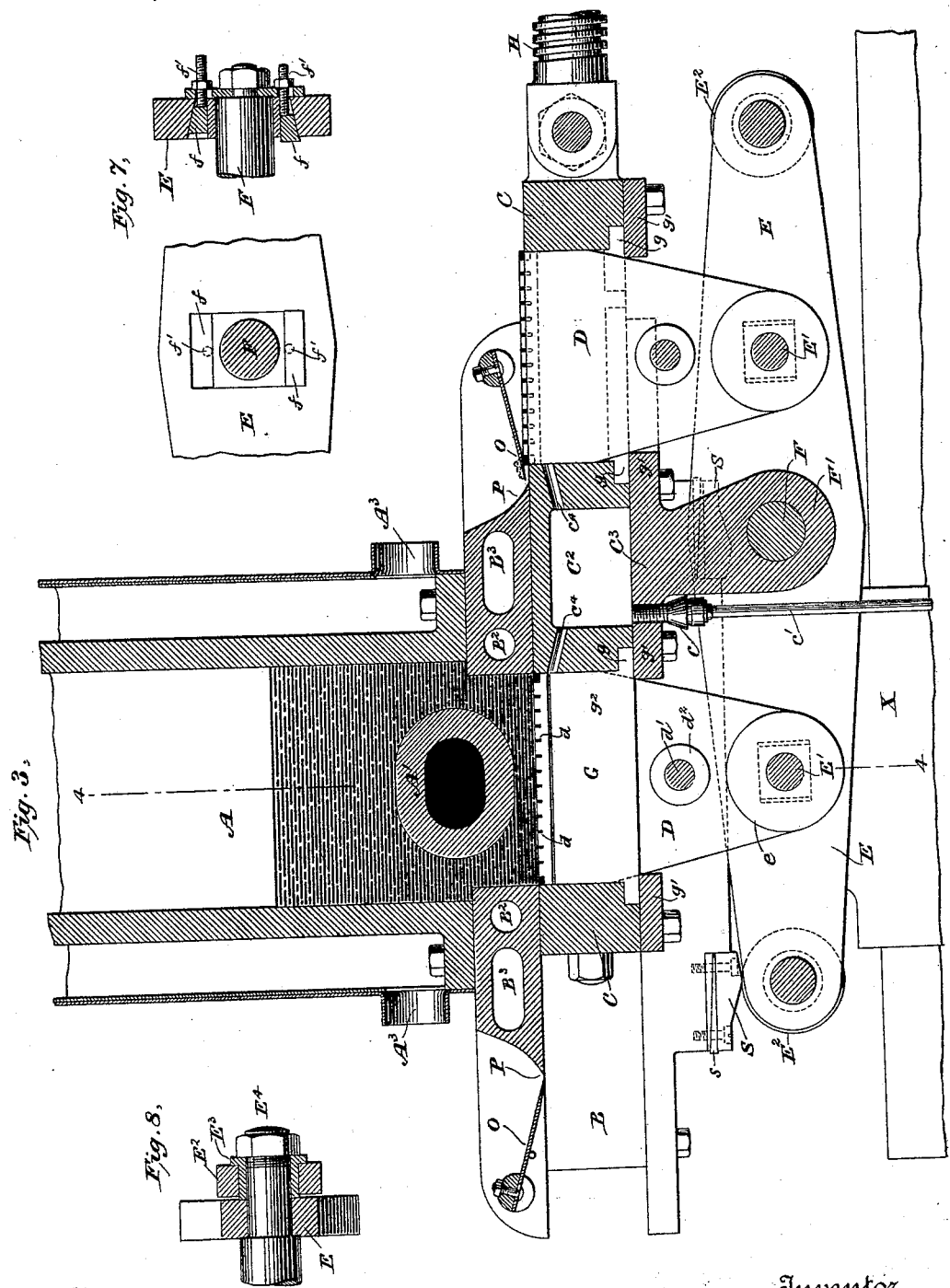

(No Model) 5 Sheets—Sheet 4.

A. F. MADDEN.
MACHINE FOR CASTING GRIDS FOR SECONDARY BATTERIES.

No. 457,879. Patented Aug. 18, 1891.

Witnesses
Geo. W. Breck
Henry W. Lloyd.

Inventor
Albert F. Madden,
By his Attorneys
Baldwin, Davidson & Wright (No Model.) 5 Sheets—Sheet 5.

A. F. MADDEN.
MACHINE FOR CASTING GRIDS FOR SECONDARY BATTERIES.

No. 457,879. Patented Aug. 18, 1891.

Witnesses
Geo. W. Breck.
Henry W. Lloyd.

Inventor
Albert F. Madden,
By his Attorneys
Baldwin, Davidson & Wight

UNITED STATES PATENT OFFICE.

ALBERT F. MADDEN, OF NEWARK, NEW JERSEY, ASSIGNOR TO JOHN M. PENDLETON, OF NEW BRIGHTON, NEW YORK.

MACHINE FOR CASTING GRIDS FOR SECONDARY BATTERIES.

SPECIFICATION forming part of Letters Patent No. 457,879, dated August 18, 1891.

Application filed September 29, 1890. Serial No. 366,528. (No model.)

*To all whom it may concern:*

Be it known that I, ALBERT FRANKLIN MADDEN, a citizen of the United States, residing at Newark, in the State of New Jersey, United States of America, have invented certain new and useful Improvements in Machines for Casting Grids for Secondary Batteries, of which the following is a specification.

Grids or plates for secondary-battery electrodes are generally composed of lead and are perforated or cellular in structure and relatively thin. It is desirable that the plates should have as many cells as possible and that the lead partitions forming the cells should be relatively thin, dense, and homogeneous, so as to give not only strength and a uniform construction mechanically, but to afford a uniform electrical conductivity and action in the plate. For these reasons it has been practically impossible to produce perfect grids having the characteristics mentioned when cast according to old methods or with ordinary apparatus.

In my improved method of operation the molten mass of metal from which the grids are to be formed is given, preferably upon one surface or side, a form or structure corresponding to that of the grid to be produced, and the molten metal having this structure is then sheared or removed from the mass of molten material. This operation is accomplished by means of a suitable mold, and when the metal is chilled therein the grid is ejected. In practicing this method the entire face of the mold corresponding with the side or largest area of the thin plate or grid to be produced, is open for the simultaneous ingress of the molten metal at all points, and every portion of the mold is therefore completely filled with homogeneous metal. The mold thus charged is removed from the mass of molten material, chilled, and the grid ejected. The molten mass of metal is contained in a suitable crucible, in which it may have been reduced to the molten state, or molten metal may be poured into a receptacle or crucible and maintained therein in a molten condition. A mold-carriage, preferably containing more than a single mold, is caused to move across the open bottom of the molten-metal receptacle. The mold when brought beneath the receptacle is filled with metal in the manner described, and as the carriage is shifted the mold is removed from beneath the receptacle, the bottom of which is then closed by a suitable plate or surface, forming part of the mold-carriage. When the metal in the mold is chilled sufficiently, it is ejected and the operation repeated. Preferably I employ a reciprocating mold-carriage having two molds therein and an intermediate temperature-regulating chamber, the wall of which serves to close the bottom of the molten-metal receptacle when neither mold is in position beneath it. As this carriage reciprocates, one mold is filled, then passes from beneath the molten-metal receptacle, which is then closed by the wall of the temperature-regulating chamber, and then the second mold is brought beneath the molten-metal receptacle. At this time the grid in the first mold is ejected and the carriage commences to move in the opposite direction to repeat the operation.

My present invention comprehends certain novel combinations and organizations of instrumentalities hereinafter specifically designated in the claims, constituting improvements upon a machine of the class shown in my application, Serial No. 359,731, filed July 24, 1890.

Figure 5:
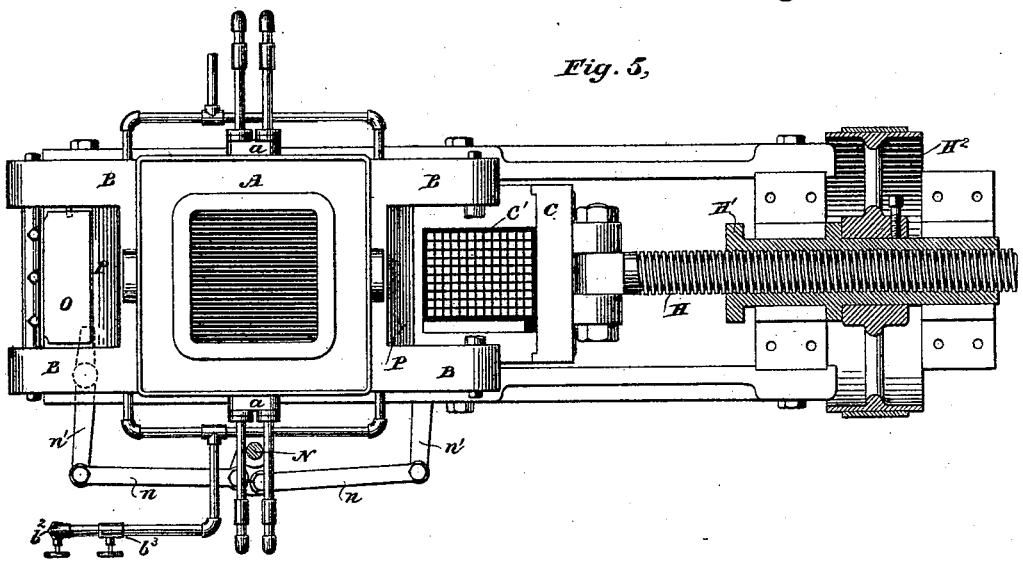
Figure 6:
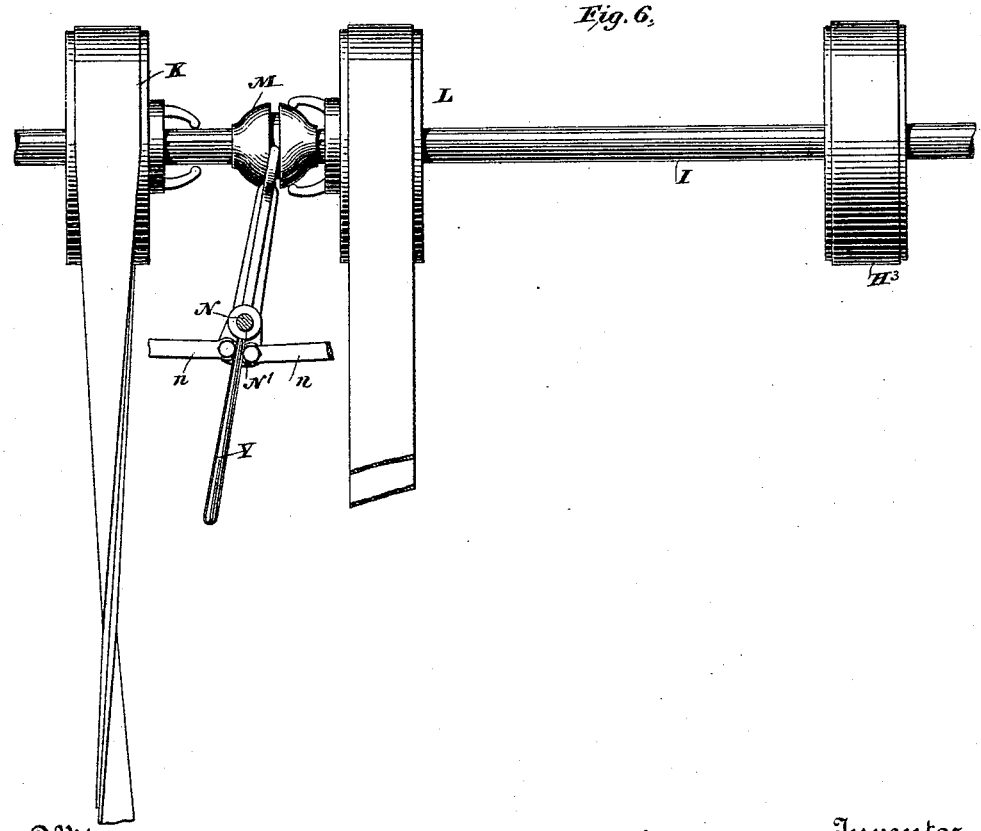
Figure 9:
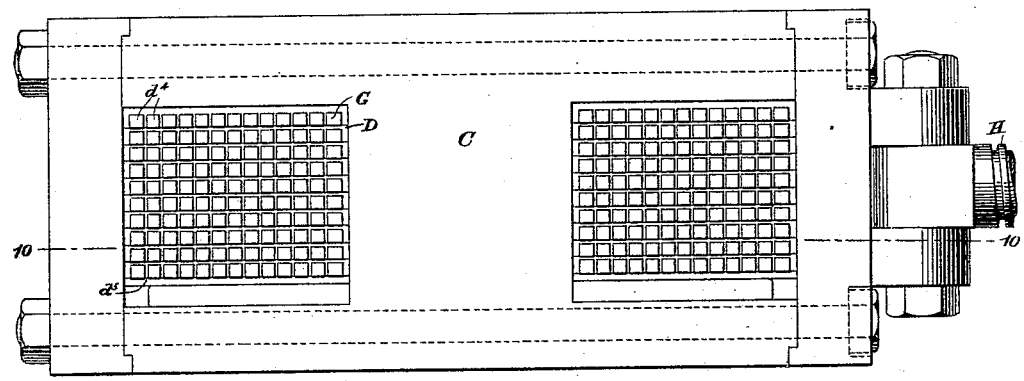
Figure 10:
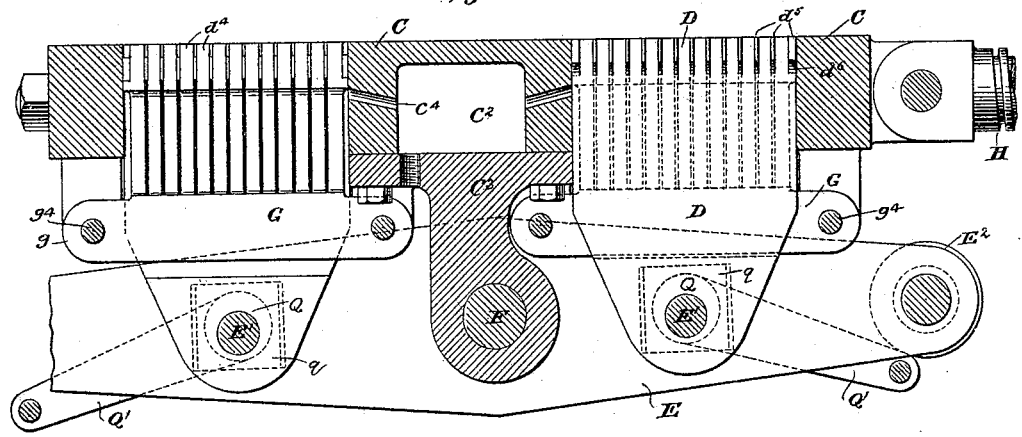
Figure 11:
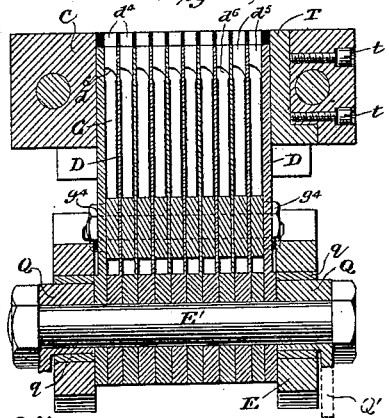
Figure 12:
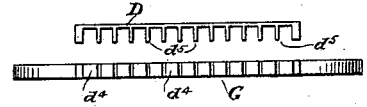

In the accompanying drawings, which show so much of a machine embodying the improvements herein claimed in the best way now known to me as is necessary to illustrate the invention, Figure 1 is a side elevation of the entire machine; Fig. 2, an end view of the machine, omitting the driving mechanism; Fig. 3, an enlarged vertical central section on the line 3 3 of Fig. 4; Fig. 4, a vertical transverse section on the line 4 4 of Fig. 3; Fig. 5, a plan view; Fig. 6, a detail plan view of the clutch-shifting devices for effecting the reciprocation of the mold-carriage. Fig. 7 shows detail views in elevation and longitudinal section of the means for adjustably mounting the ejector-operating levers on their bearing-shaft. Fig. 8 is a detailed sectional view showing the cam-roller on the end of the ejector-lever; Fig. 9, a plan view of the mold-carriage with molds of a modified construction therein; Fig. 10, a longitudinal section therethrough on the line 10 10 of Fig. 9; Fig. 11, a transverse section on the line 11 11 of Fig. 10, and Fig. 12 a detail view showing end views of a mold-bar or core-plate and ejector-plate.

The molten-metal receptacle A, made of any suitable material, has an open bottom, across which is arranged a fire-box A', consisting of a reverberatory passage-way of any suitable cross-section. At each end of the passage-way the flame from a Bunsen burner $a$ is introduced. The receptacle rests upon the rectangular frame B of the mold-carriage, in opposite sides of which the mold-carriage C (which is reciprocated, as hereinafter described) has its bearings. The frame is supported upon a bed-plate by standards X.

In the organization shown each side of the mold-carriage frame B in line with the direction of the reciprocation of the mold-carriage forms a chill-plate. Each chill-plate has formed in it a chamber $B^3$ for the passage of steam or air, which enters through pipes $b^2$ $b^3$, Figs. 1, 2, and 5, and between these chambers and the interior wall of the frame are formed air-passages $B^2$, open to the atmosphere, the purpose of the construction being to prevent the chilling of the mass of molten metal. The receptacle A is preferably surrounded by a jacket having openings $A^3$ near the bottom and of a diameter sufficient to leave an air-space, such as indicated, around the receptacle. This annular space may be closed by a ring-cover $A^4$, and the receptacle A may of course be also provided with a cover.

The mold-carriage C, which may be constructed as shown or in any other suitable manner, has therein two molds C', (seen in plan in Fig. 5,) and having the shape or contour of the grid to be produced. Storage-battery plates ordinarily have the form of the mold indicated—that is to say, they are rectangular, with a lug or projection at one corner. Transverse mold-bars G are fixed in the molds, being supported by means of lugs or feet $g$ at the lower corners of the bars or plates which fit a corresponding seat in the bottom of the mold-carriage, and are held in place by plates $g'$, bolted to the under face of the carriage. The tops of these mold bars or plates are of course flush with the top of the mold-carriage, and spaces between them are equal to the thickness of the partitions between the cells or perforations of the grid to be cast. They are also each formed with transverse notches $d$, the width of each of which is equal to the thickness of the partitions between the cells and the depth of which is equal to the thickness of the plate to be produced.

Ejector-plates D occupy the spaces between the mold-bars and between the mold and outer mold-bars on each side, being supported in the following manner: Beneath the mold-carriage and mounted upon the ends of a shaft F, having its bearing in a block F' depending from the bottom of the reciprocating mold-carriage, are parallel ejector-operating levers E. The ejector-plates D are fastened to and between the levers E by means of cross-bolts E', the plates being held at a proper distance apart by spacing-washers $e$. In order to support and stiffen the gang of ejector-plates, they are similarly bolted together at a point between the mold-bars and the ejector-levers E by bolts $d'$ and washers $d^2$. The extent of the depression of the ejector-plates below the surface of the mold-bars determines of course the thickness of the plate to be cast. One side of each mold is shown as formed by a laterally-adjustable plate T, against which bear screws $t$, passing through the carriage, the object being to afford the slight adjustment that may be necessary to insure a close fit of the mold bars and plates against each other.

At each end of the mold-bars G a notch $d^3$ is formed corresponding in length to the width of the rim of the grid, and the outer ejector-plates D are of the same thickness. The bolts E', passing through the ejector-operating levers E and supporting the ejector-plates D, are provided with suitable boxes (indicated by dotted lines in Fig. 3) to permit a perfectly rectilinear movement of the ejector-plates as the levers E are rocked upon the shaft F.

On the ends of the ejector-levers are rollers $E^2$, that run upon adjustable cam-plates S on the mold-carriage frame. The manner of mounting these rollers upon the levers E is indicated in detail in Fig. 8. The roller $E^2$ has its bearing upon a sleeve $E^3$, located between the clamp-bolt $E^4$ and the side of the lever E, and the tightening of the bolt $E^4$ does not interfere with the free revolution of the roller. The cam-plates S are secured by bolts, (indicated by dotted lines,) and between the backs of the plates and the frame are wedges $s$, the advancement or withdrawal of which serves to adjust the cam-plates. As the mold-carriage is reciprocated, the rollers $E^2$ run upon the cam-plates S, rock the levers E upon the shaft F, and effect the movement of the ejectors. The parts are so related that when a mold has been brought beneath the molten-metal receptacle and the carriage is completing the limit of its stroke the levers E at that end are depressed by the rollers $E^2$, running upon the cam-plates S, and the ejectors are depressed within the mold, permitting the simultaneous ingress of the molten metal into all parts of the mold. As the carriage moves in the opposite direction, the mold, leaving the bottom of the molten-metal receptacle, passes beneath the chill-plate at one side of the frame, the bottom of the mold is closed by the wall of the chamber $C^2$, and by the continued movement of the carriage the second mold is brought beneath the bottom of the receptacle. As this movement is completed, the cams S rock the levers E, serving to advance the ejectors to eject the grid from one mold and to withdraw the ejectors to permit the simultaneous ingress of the metal into all parts of the other mold. The ejectors are shown as secured to the rocking levers E on each side of its rock-shaft F and intermediate of that shaft and the ends of the levers E. One set of ejectors is nearer the shaft F than the other. Consequently it has a smaller range of movement in the mold, and thus forms a grid of less depth than the other.

On opposite sides of the mold-carriage, and transversely to the line of travel of the carriage, knives or scrapers O are located, the edges of which bear upon the surface of the molds and mold-carriage and cut or strip off any surplus fins or feathers of lead that may form on the top of the mold. An important result attending the use of such a device is that the scraping action of the knife forms a burr on the edges of the partitions of the grid. When I desire especially to so form the grids, the edge of the knife or scraper O should be comparatively dull and not of such keenness as to shear or cut the metal off perfectly clean. These burrs serve to retain the active material that is subsequently placed in the cells or perforations of the plate, and when the plates are so formed they would preferably be filled with active material from the opposite side of the plate. When the mold-carriage has reached its limit of reciprocation in one direction, the ejectors, as before mentioned, have been advanced until their edges are flush with the face of the mold-bars and the ejected grid lies upon the surface of the mold. On the return movement of the carriage the grid encounters a stripping-edge P, formed on or secured to the mold-carriage frame and is lifted or discharged from the mold. The metal in the receptacle, it will be seen, flows around the heater or reverberatory passage-way A' on its way to the molds, and is thus kept fluid at that point.

In starting the machine, a proper heat is maintained in the reverberatory passage-way A' by means of the Bunsen burner sufficient to reduce to a molten condition any lead or alloy that may be placed therein, or to maintain in the proper condition molten lead that may have been poured into the receptacle. In addition to this, the flame from a Bunsen burner $c$, supplied with gas through a pipe $c'$, is thrown into the chamber $C^2$, the purpose of which is to give the mold-carriage and the molds the proper temperature. By this means the wall of the chamber $C^2$, that at intervals closes the bottom of the molten-metal receptacle, is maintained at such temperature as to prevent the chilling of the molten metal. The temperature within the chamber $C^2$ may be regulated by controlling the supply of gas to the burner; but to further lower the temperature the gas may be entirely shut off and air heated to the proper degree introduced through the Bunsen burner. From the chamber $C^2$ ports $C^4$ conduct either the products of combustion or air laterally into the molds and control the temperature therein. To provide for this circulation, the sides of the mold-bars are cut away, as indicated at $g^2$, so that the heated air or products of combustion from the chamber $C^2$ pass along their sides and around the ejector-plates and escape at the lower edges of the mold-bars. These ports are preferably formed near the ends of the mold-bars farthest removed from the ports $C^4$. In this manner I am enabled to maintain the desired uniform temperature adapted to the most favorable or perfect operation of the machine. The bottom of the chamber $C^2$ is closed by a plate $C^3$, whose edges $g'$ serve to retain the core-bars in the molds, and the depending lug or bearing F' is also formed with or bolted to this plate.

The levers E, carrying the ejector-plates, may be vertically adjusted upon the bearing-shaft F in the following manner to regulate the thickness of the plate to be cast. (See Fig. 7.) The box surrounding the end of the shaft F occupies an elongated opening in the lever E, and both above and below the boxing are adjustable wedges $f$, from which project threaded bolts $f'$. By means of nuts on these bolts the wedges may be adjusted in or out to raise or lower the lever E with reference to the shaft.

The reciprocation of the mold-carriage may of course be effected in any suitable manner. The means shown are as follows: A screw-shaft H, secured to and extending horizontally from one end of the mold-carriage, passes through a corresponding threaded sleeve H', to which the hub of a driving-pulley $H^2$ is secured. This pulley is driven in either direction by a belt $H^3$, passing over a pulley on the main driving-shaft I. Two loose pulleys K L, driven in opposite directions by belts or otherwise from any suitable source of power, are loosely mounted upon the shaft I, and the shaft is driven by one or the other, according to the position of the clutch mechanism. This mechanism consists of a clutch M, sliding laterally on a feather on the driving-shaft and adapted to be thrown into engagement with the clutch of either pulley K or L by means of a vertical rock-shaft N, from which an arm extends laterally to the clutch M, to which it is swiveled. At its lower end the shaft is provided with a lateral projection or plate N', to which are pivoted two oppositely-extending links $n$, pivotally connected at their ends to levers $n'$, pivoted to the under side of the mold-carriage frame. The end of these levers lies in the path of a stop $n^2$ on one of the levers E. (See Figs. 2 and 4.) The stops are so related to the levers that the clutch is shifted as the mold-carriage completes its movement in either direction. By means of a handle Y in the rock-shaft it may be thrown to operate the clutch devices at any time either to stop the carriage or cause its movement in either direction.

The molds shown in the figures thus far particularly described are of the character shown in my pending application, Serial No. 359,731, filed July 24, 1890, and are not specifically herein claimed. They are suitable and practical to accomplish the desired end; but I prefer to employ molds of the character illustrated in Figs. 9, 10, 11, and 12, which, as is obvious from those figures, may be substituted for the molds already described.

Instead of the mold-bars being solid plates notched, as before described, the notches are extended to a suitable depth, so as to form a series of independent cores $d^4$ of suitable cross-section, those shown being rectangular. In other words, the core-bar is of a comb-like form and presents a series of individual rectangular core-bars mounted upon a common head or bar. In the construction shown, especially in Fig. 10, instead of forming small lugs at the lower ends of the bars and mounting them in the molds, as shown in Fig. 3, the lugs $g$ are relatively large, and the core-bars are held in place by bolts $g^4$, passing through the lugs $g$, and suitable space-washers, the bolts being supported in lugs projecting from the under face of the mold-carriage.

The ejector-plates D, instead of being flat plates, such as shown in Fig. 4, are plain upon one side, and on the opposite side have near their upper ends parallel projecting ribs that form rectangular openings, closed upon three sides, and within these openings the core bars or rods $d^4$ lie. These ribs are indicated by $d^5$ and their lower edges terminate as shown in curved lines $d^6$, Fig. 11. Below this point the plates are flat and are mounted in the levers E and braced, as already described. The edges of the ribs $d^5$ of one plate bear against the back of an adjacent plate. Each core rod or bar is therefore completely surrounded on all four sides by the ejectors. With a mold of this character the thickness of the plate to be cast may be varied to any desired extent, the thickness not being limited, as it is in the mold first described, by the depth of the notches $d$.

The adjustment of the ejectors to regulate the thickness of plate to be cast may be accomplished in the following manner: The lower ends of the ejector-plates, which in the construction shown in Fig. 11 are thickened, so as to give the requisite spacing without the use of washers, as described in Fig. 4, closely fit the rod or cross-bolt E'. Each end of the rod is surrounded by an eccentric sleeve Q, seated in a bushing $q$ in the opening in the lever E. By means of a handle or lever Q', extended from these eccentrics, they may be revolved more or less to raise or lower the shaft E', and consequently the ejector-plates, with reference to the levers E. They are frictionally or otherwise held in place at any point to which they may be adjusted. One advantage of a mold of this character is that the entire bottom of the mold is formed by the movable ejector-plates, and when these plates are advanced to eject the casting from the mold they operate upon every part of the side or bottom of the casting.

In the mold first described the ejector-plates act upon one line of partitions only, and those partitions formed by the notches in the mold-bars have to be ejected from those notches by the ejector-plates acting upon each side. This is liable under some circumstances to injure the partitions formed by the notches. The mold, by reason of this construction, is more thoroughly cleaned, there being no possibility of any of the metal hanging or sticking in the mold. The core bars or rods $d^4$ need not necessarily be rectangular. They might be hexagonal or of other suitable cross-section.

Having described my improved method of operation and a complete apparatus for practicing it, it may be well to point out wherein plates produced according to the invention are unlike and superior to cast plates produced according to the old method. Heretofore cast grids for secondary batteries have been made in chill-molds, the molten metal being poured at the edge of the mold; but this is objectionable, among other reasons, because of oxidation within and on the surface of the plate, and also because of the difficulty of distributing the lead completely and uniformly through all parts of the mold where a proper number of cells are to be formed in the plate and where the partitions are relatively thin. In making plates according to my invention the molten metal being introduced under suitable pressure simultaneously and equally into the face of the mold all parts of the mold must be equally and uniformly filled with homogeneous metal, and I am therefore enabled to produce grids of given surface area, having a relatively large number of cells or perforations formed by relatively thin partitions of homogeneous metal. The ordinary chill-mold is longitudinally divided and has abutting teeth or projections corresponding to the perforations of the grid, and unless the parts of the mold fit with perfect accuracy against each other feathers or films of lead are formed between the faces of the bars. Further, chill-molds are likely to buckle, and this results in a curvature or malformation of the grid, which must be remedied by grinding or facing off the mold. In imperfect grids, in which there are points of oxidation in the metal or porous non-homogeneous or imperfect points in the partitions, areas of increased resistance are created, thus throwing an abnormal duty on the other portions of the plates and impairing the general action of a storage-battery made of such plates. Aside from these objections incident to grids cast according to the old method, the molds in which they have been made being divided, the abutting molds or core-bars have to be made tapering or of reduced sectional area on their ends for the purpose of permitting the ready withdrawal of the cores or mold-bars from the cast grid. The perforations or cells in the grid are therefore of smaller section in the center and slope outwardly on each side. A grid having this structure is objectionable not only because of the reduced amount of active material that may be contained in its cells, but also because the inclined walls of the partitions form wedge-like projections extending into the active material in the perforations, and in practical use the expansion of the active material bearing upon these inclined walls causes the material to split centrally in the plane of the plate and fall out of the perforations or cells. With plates cast according to my invention the walls of the partitions forming the cells have plane surfaces at right angles to the plane of the face of the plate.

Another objection incident to the use of the old form of the mold is that the lubricant in such molds—such as lamp-black or soot or whatever used—is liable to become lodged between opposing faces of the core bars or teeth, and this causes a lack of uniformity in the thickness and weight of the grids.

To restate the advantages of grids produced according to my invention, the metal is absolutely homogeneous at every point, and being entirely free from oxides or other impurities (this result being due not only to the fact that the metal forming the grids is taken from the bottom of the molten mass, but also to the manner of filling the molds from the face simultaneously at all points as the ejectors recede, so that the metal has only a distance equal to the thickness of the plate to travel, and is also not exposed to the action of the air) the grids are absolutely of uniform capacity or conductivity throughout, and therefore a much less weight will give an efficiency requiring a much greater weight of metal with ordinary grids. I also obtain a far larger number of cells or perforations than can be obtained according to the old method, and the metal partitions forming the cells are of uniform density and homogeneity, and are far thinner than they can possibly be made when grids are cast in the ordinary manner. I also avoid the faulty wedge-shaped wall above referred to, and for this reason the plates receive a larger quantity of active material which is retained in the plates more securely. This result is also assisted by the formation of burrs upon the edges of the partitions on one side of the plate, as before described. It therefore follows that with a given amount of metal I produce a battery with greater capacity for constant output, or I may with a very considerable less weight of metal produce a battery capable of a constant output of current equal to that of batteries having grids made according to the old method. Since for traction purposes the weight of the battery and the amount of constant output of current are of the first importance, it will be perceived that for practical work a battery having grids made according to my invention possesses very material and striking advantages, aside from the mere question of economy in manufacture.

I claim as my invention—

1. The combination of the metal-receptacle, a movable mold-carriage having a mold that closes the bottom of the receptacle when the carriage is in one position, a temperature-regulating chamber the face of which closes the crucible when the carriage is in another position, and means for controlling the temperature of said chamber.

2. The combination of a receptacle for molten metal, a movable mold-carriage, the mold therein closing the receptacle when the carriage is one position, a temperature-regulating chamber in the carriage that closes the receptacle when the carriage is in another position, a communication between said chamber and the mold, and means for regulating the temperature in the chamber, whereby both the temperature of the mold and the surface of the lead in the chamber adjacent to the mold may be regulated.

3. The combination of the open-bottom receptacle, means for maintaining molten lead therein, a movable mold-carriage having molds adapted to close the receptacle, and a temperature-regulating chamber, the face of which is also adapted to close the receptacle, and means for moving the mold-carriage to successively bring a mold or the temperature-regulating chamber into position to close the receptacle.

4. The combination of a molten-metal receptacle having an opening for the discharge of the metal, the movable mold-carriage closing the discharge-opening, a mold therein consisting of two series of parts which together afford the spaces in the molds, one of said series being stationary, and mechanism for moving the other series into two positions, one of which affords the depression to give the mold the desired form and in the other of which the casting is freed from the mold.

5. The combination of a receptacle for molten metal, a mold-carriage upon which the receptacle is mounted, a chill-plate forming part of the mold-carriage having an air-passage therein adjacent to the crucible, and a chill-passage for a temperature-reducing medium.

6. The combination of a receptacle for molten metal, a reciprocating mold-carriage thereunder having molds adapted to successively close the receptacle, a rock-shaft, rock-shaft-operating levers adapted to be operated by the reciprocation of the mold-carriage in either direction, clutch mechanism operated by the rock-shaft, and driving mechanism adapted to reciprocate the carriage in either direction automatically, according to the position of the clutch.

7. The combination of the lead-receptacle, a movable mold-carriage, the mold therein that is alternately brought into position to close the receptacle and removed therefrom by the movement of the carriage, the ejectors and their operating mechanism, and a stripper P for removing the casting from the mold during the movement of the carriage.

8. The combination, with a mold having a series of core-bars and ejectors interposed between the core-bars, of a laterally-adjustable plate arranged at one side of the series of core-bars and ejectors, whereby the bars and ejectors may be closed up against each other by the adjustment of said plate.

9. The combination of a molten-metal receptacle and a mold adapted to be filled with metal from said receptacle, said mold having therein plates arranged in alternation and constituting mold or core bars and ejectors, said plates being formed with passages for the circulation of a temperature-regulating medium.

10. The combination of an open-bottom molten-metal receptacle, an open-faced mold arranged to alternately close the bottom of the receptacle and be removed therefrom, mold-bars and ejectors in said mold, and means for changing the level of the bars and ejectors with reference to each other to afford the desired depression in the mold and then to again change their relation to eject or free the casting from the mold.

11. The combination of the series of mold bars or cores $d^4$, the series of ejector-plates having ribs $d^5$ embracing the cores, as described, and means for operating one of said series with reference to the other to admit the metal to the face of the mold and also to free the casting from the mold.

12. The combination of the mold, the fixed core or mold bars, the movable ejectors, the operating-levers upon which they are mounted, and the eccentrics by which they are adjusted to vary the depth of the mold.

13. The mold of relatively large surface area and small depth having multiple mold or core pieces surrounded and separated by multiple connected channels, and a channel surrounding the group of core-pieces and multiple channels, in which surrounding channel is formed the rim of the cellular plate to be cast, in combination with means for admitting molten metal to the larger face of the mold parallel with the core-pieces, and means for ejecting the cellular plate from the mold, substantially as set forth.

14. The mold of relatively large surface area and small depth having multiple mold or core pieces surrounded and separated by multiple connected channels, and a channel surrounding the group of core-pieces and multiple channels, in which surrounding channel is formed the rim of the cellular plate to be cast, in combination with means for admitting molten metal to the larger face of the mold, the surface area of the molten metal entering the mold being equal or approximately equal to the larger face of the mold, whereby the molten metal has only to travel the depth of the mold, and means for ejecting the cellular plate from the mold, substantially as set forth.

15. The mold of relatively large surface area and small depth having multiple mold or core pieces surrounded and separated by multiple connected channels, a channel surrounding the group of core-pieces and multiple channels, in which surrounding channel is formed the rim of the cellular plate to be cast, and movable ejectors forming the bottoms of said channels, the flush ends of the core-pieces forming one face of the mold and the thickness of the cellular plate to be cast being determined by the distance between the plane of the ends of the core-pieces and the plane of the faces of the ejectors, in combination with means for admitting molten metal to the larger face of the mold, and means for moving the ejector to lift or eject the cellular plate from the mold, substantially as set forth.

16. The mold of relatively large surface area and small depth having multiple mold or core pieces surrounded and separted by multiple connected channels, in combination with means for admitting molten metal to the larger face of the mold parallel with the core-pieces, and means for ejecting the cellular plate from the mold, substantially as set forth.

In testimony whereof I have hereunto subscribed my name.

ALBERT F. MADDEN.

Witnesses:
FRANK S. OBER,
EDWARD C. DAVIDSON.